United States Patent
Shikama et al.

(10) Patent No.: US 7,079,318 B2
(45) Date of Patent: Jul. 18, 2006

(54) TRANSMISSION SCREEN AND PROJECTION DISPLAY

(75) Inventors: Shinsuke Shikama, Tokyo (JP); Hiroshi Suzuki, Tokyo (JP); Kohei Teramoto, Tokyo (JP); Akihisa Miyata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/489,893

(22) PCT Filed: May 28, 2002

(86) PCT No.: PCT/JP02/05165

§ 371 (c)(1),
(2), (4) Date: Mar. 17, 2004

(87) PCT Pub. No.: WO03/032079

PCT Pub. Date: Apr. 17, 2003

(65) Prior Publication Data

US 2004/0246578 A1    Dec. 9, 2004

(30) Foreign Application Priority Data

Oct. 5, 2001    (JP) .............................. 2001-310039

(51) Int. Cl.
G03B 21/60    (2006.01)
G03B 21/56    (2006.01)
G02B 27/12    (2006.01)

(52) U.S. Cl. ..................... 359/457; 359/460; 359/624
(58) Field of Classification Search ................ 359/452, 359/453, 455, 456, 457, 460, 621, 622, 624
See application file for complete search history.

(56) References Cited

U.S. PATENT DOCUMENTS

| 4,923,280 A * | 5/1990 | Clausen et al. ............. 359/456 |
| 5,615,045 A * | 3/1997 | Takuma et al. ............. 359/456 |
| 5,875,013 A * | 2/1999 | Hiroshi ....................... 349/110 |
| 6,726,859 B1 | 4/2004 | Suzuki et al. ................ 264/2.5 |
| 6,771,419 B1 * | 8/2004 | Yamagishi et al. ......... 359/457 |
| 2004/0223217 A1 * | 11/2004 | Yoon et al. ................. 359/455 |

FOREIGN PATENT DOCUMENTS

| JP | 26-004482 B1 | 8/1951 |
| JP | 49-0002533 A | 1/1974 |
| JP | 153334 | 9/1982 |
| JP | 59-119340 A | 7/1984 |

(Continued)

*Primary Examiner*—Melissa Jan Koval
(74) *Attorney, Agent, or Firm*—Birch, Stewart, Kolasch & Birch, LLP

(57) ABSTRACT

A transmission screen has a refraction total reflection Fresnel lens plate, a stray light eliminating plate, and an image display plate. The stray light eliminating plate has a condensing lens array and black stripes. The array has unit lenses arranged at an incident plane of the transparent substrate in a periodic structure in an up-and-down direction. The black stripes have transparent sections placed near condensing light points of the unit lens and opaque sections around the condensing light points of the unit lenses. The sections are alternately arranged at the outgoing plane of the transmission substrate in a periodic structure in an up-and-down direction. The image display plate has lenticular lenses in which unit lenses are arranged in a periodic structure in a horizontal direction at an incident plane of the transmission substrate of a scattering characteristic capable of scattering light fluxes.

22 Claims, 7 Drawing Sheets

FOREIGN PATENT DOCUMENTS

| | | |
|---|---|---|
| JP | 61-277935 A | 12/1986 |
| JP | 62-019837 A | 1/1987 |
| JP | 64-026831 A | 1/1989 |
| JP | 01-309037 A | 12/1989 |
| JP | 03-098038 A | 4/1991 |
| JP | 03-194531 A | 8/1991 |
| JP | 05-072634 A | 3/1993 |
| JP | 07-306307 A | 11/1995 |
| JP | 11-142613 A | 5/1999 |
| JP | 2000-137294 A | 5/2000 |
| JP | 2001-005103 A | 1/2001 |
| KR | 1999-50118 | 7/1999 |

\* cited by examiner

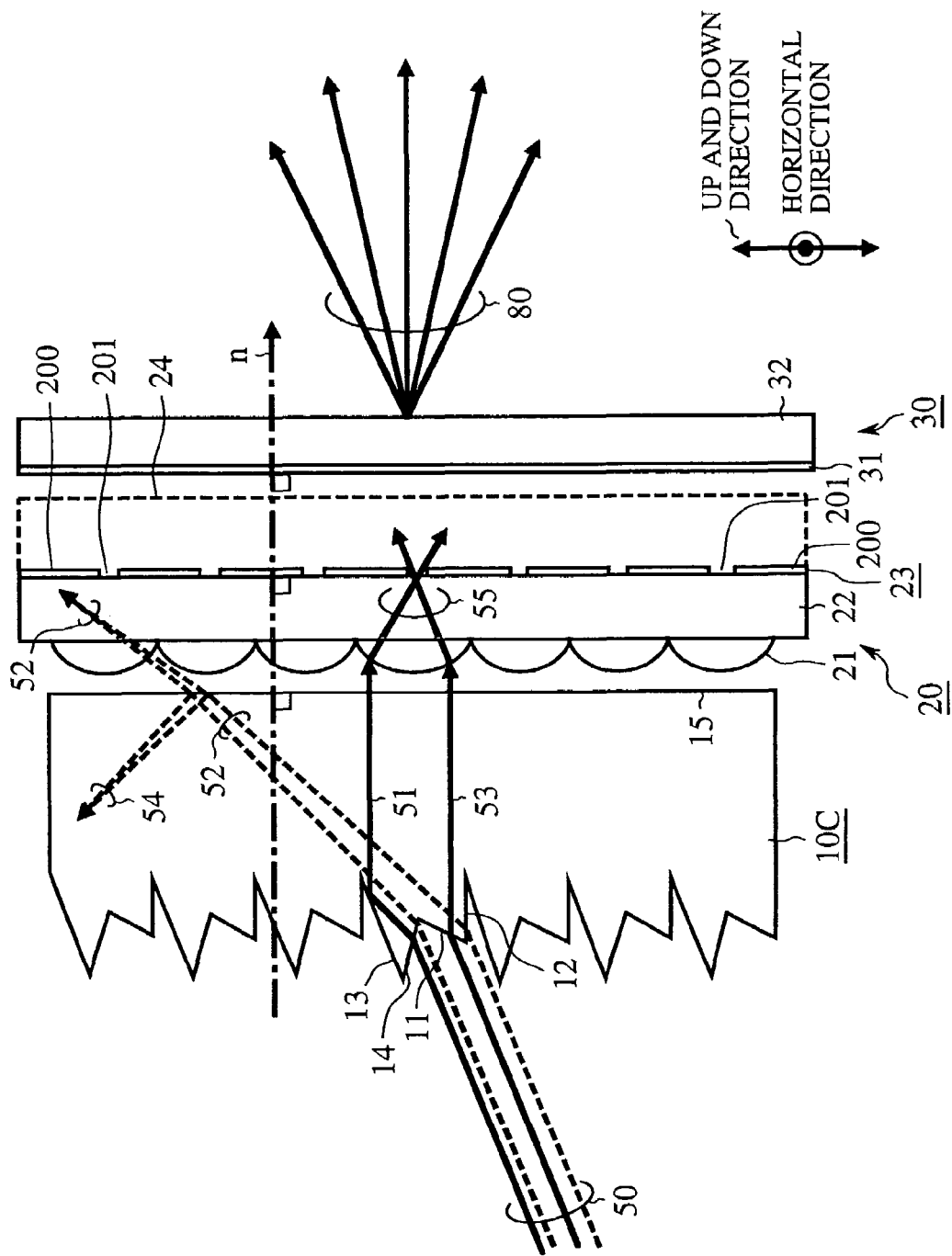

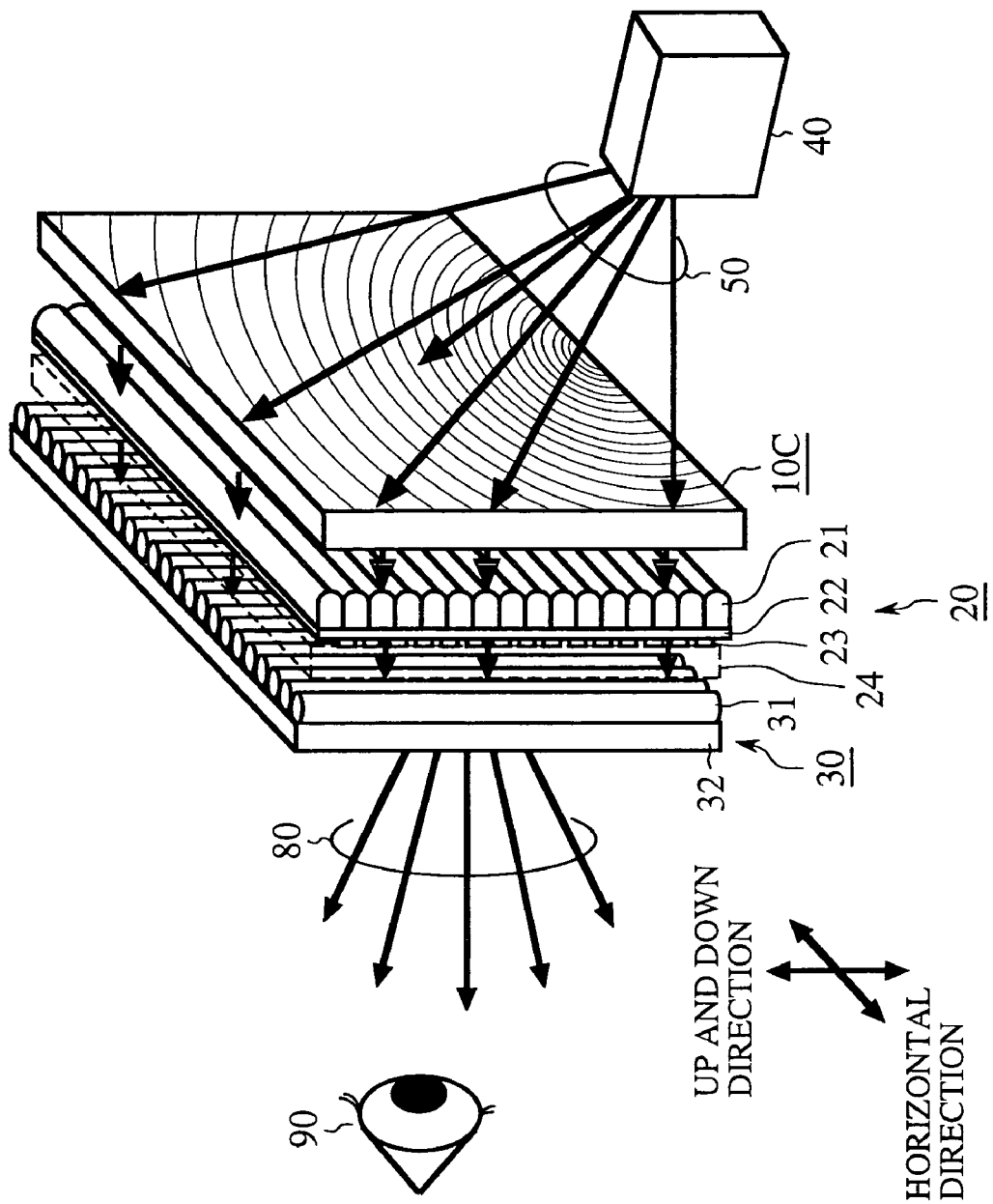

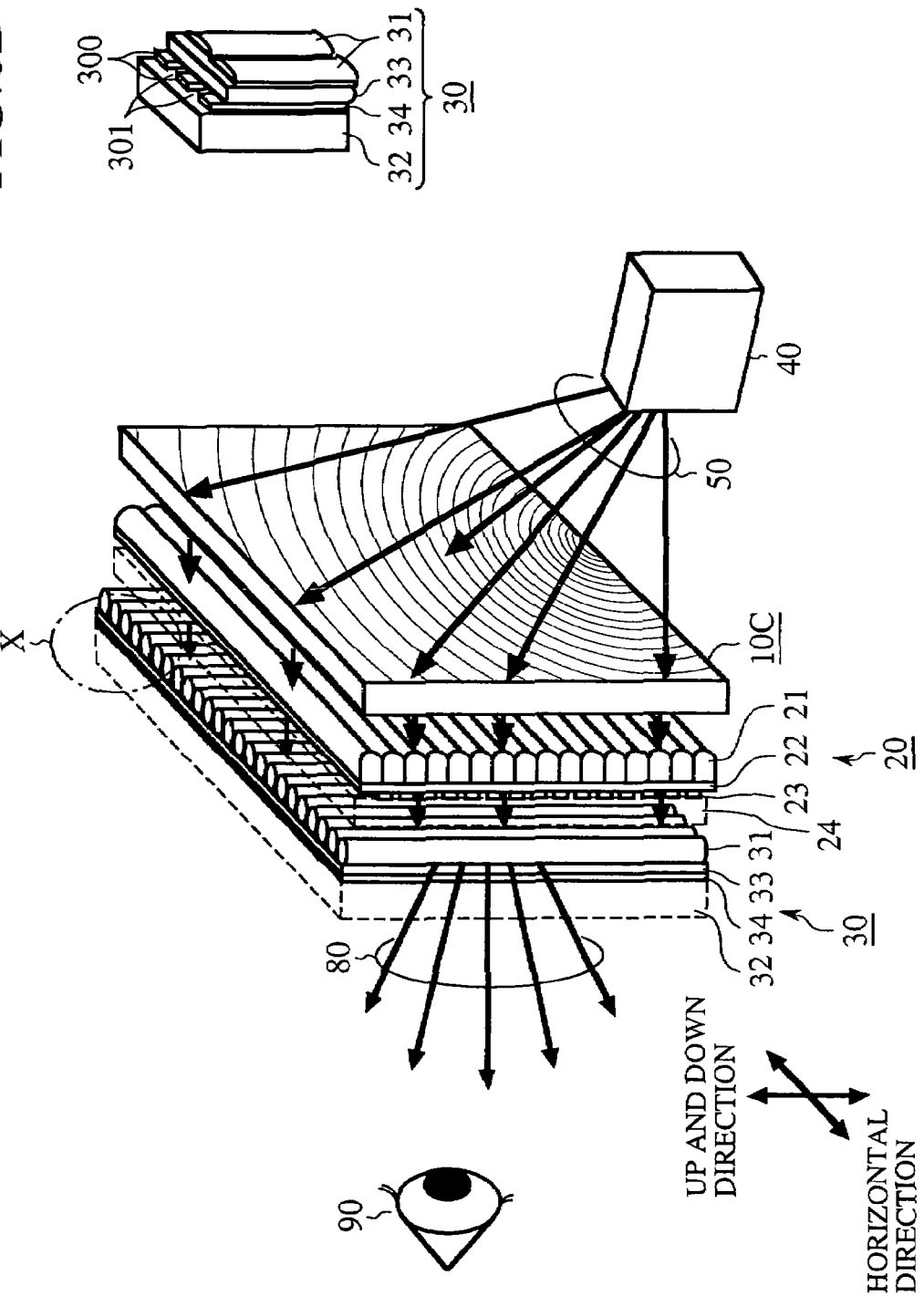

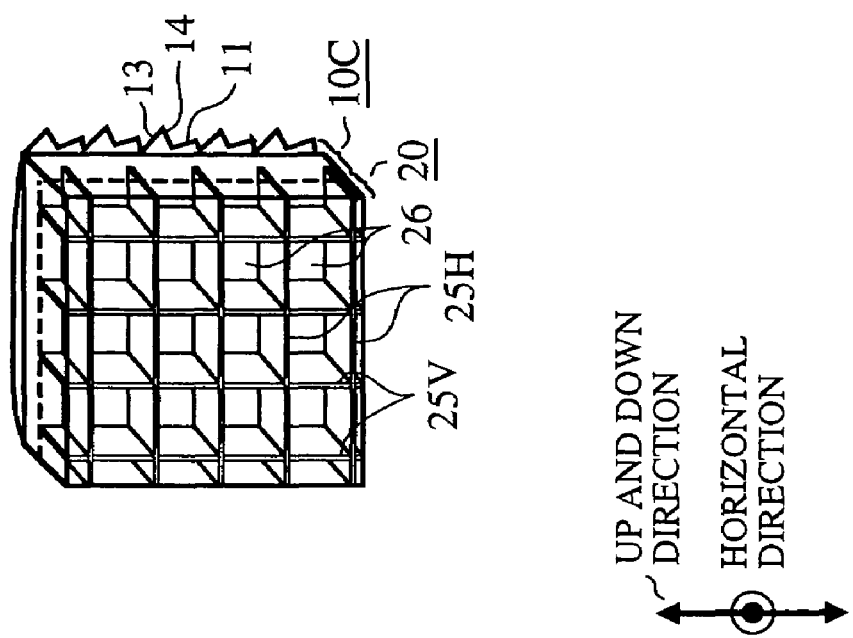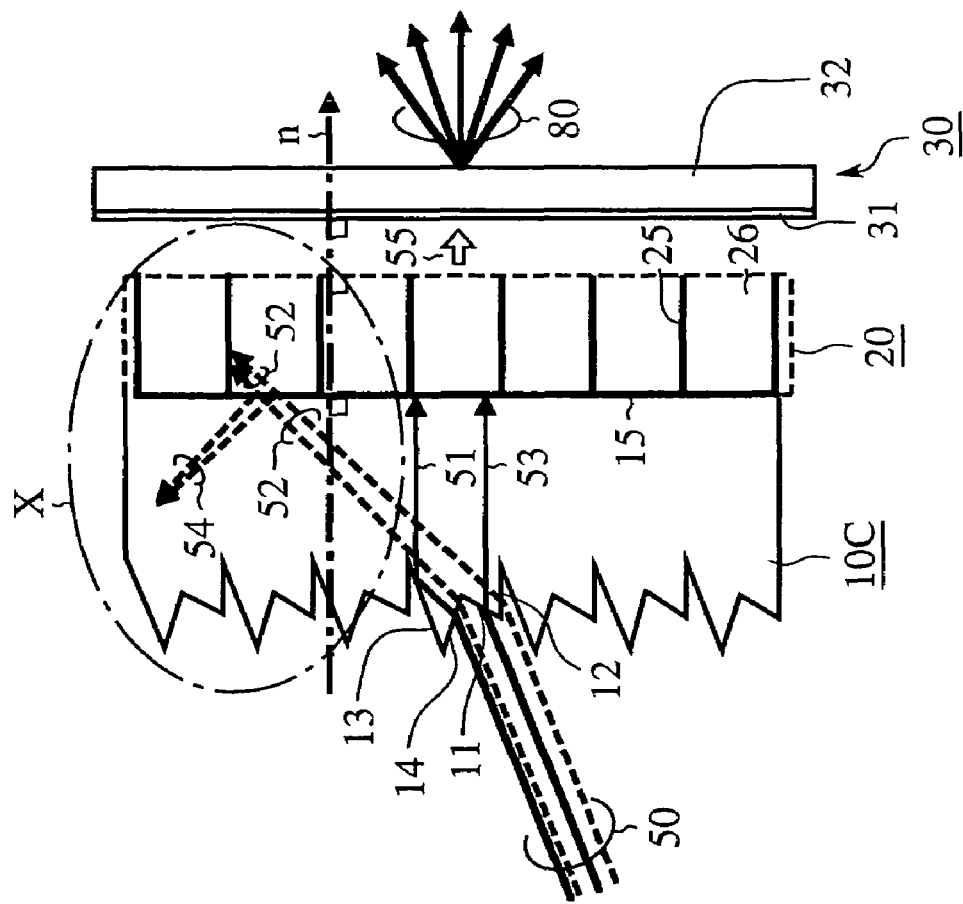

TRANSMISSION SCREEN AND PROJECTION DISPLAY

TECHNICAL FIELD

The present invention relates to a transmission screen capable of preventing a deterioration of a display characteristic generated therein caused by an ineffective flux of light, and also relates to a projection display device using the transmission screen.

BACKGROUND ART

A description will now be given of problems of conventional transmission screens using various kinds of Fresnel lens means such as a refraction Fresnel lens plate, a total reflection Fresnel lens plate, and a refraction total reflection Fresnel lens plate by referring to FIG. 1 to FIG. 3.

FIG. 1 is a diagram showing a configuration and operation of a conventional refraction Fresnel lens plate. FIG. 1 shows a shape of a cross section of the conventional refraction Fresnel lens plate in which a refraction Fresnel plane is formed at an incident side of a projected light flux. In FIG. 1, reference character 110A is a refraction Fresnel lens plate (as refraction Fresnel lens means), reference number 111 denotes a refraction inclined plane (as a refraction Fresnel plane), 112 indicates an ineffective facet plane (as a refraction Fresnel plane), and 115 designates an outgoing plane. Reference character n designates a normal of the refraction Fresnel lens plate 110A (or the outgoing plane 115).

Reference number 150 designates a projected light flux of the refraction Fresnel lens plate 110A, 152 denotes an ineffective flux of light, 153 indicates an effective flux of light. The refraction Fresnel lens plate 110A comprises the refraction inclined plane 111 and the ineffective facet plane 112 adjacent to the plane 111, which are formed in a periodic structure.

Next, a description will now be given of the operation.

The projected light flux 150 enters in an angle to the normal n of the refraction Fresnel lens plate 110A. A part of the light flux 150 is refracted (in optical action) by the refraction inclined plane 111 toward the direction of the normal n, and outputs as an effective flux of light 153 from the outgoing plane 115 of the refraction Fresnel lens plate 110A.

On the other hand, the remaining part of the light flux 150 is refracted (in optical action) at the ineffective facet plane 112 and becomes ineffective flux of light 152.

The ineffective flux of light 152 inclines to the normal n, a part thereof outputs through the outgoing plane 115, and another part thereof is reflected at the outgoing plane 115. The ineffective flux of light 152 reflected at the outgoing plane 115 enters the refraction inclined plane 111 or the ineffective facet plane 112 again, which form the refraction Fresnel lens plate 110A. The refraction and the reflection of the ineffective flux of light 152 are repeated between the refraction inclined plane 111 or the ineffective facet plane 112 and the outgoing plane 115.

The effective flux of light 153 in the above light fluxes is a normal image light. The ineffective flux of light 152 causes the generation of a double image and a ghost image to display spots and line images at incorrect display positions.

FIG. 2 is a diagram showing the explanation of the structure and the operation of the conventional total reflection Fresnel lens plate. FIG. 2 shows the shape of the cross section of the total reflection Fresnel lens plate in which the total reflection Fresnel plane is formed at the incident side of the projected light flux. In FIG. 2, reference character 110B is the total reflection Fresnel lens plate (total reflection Fresnel lens means), reference number 113 denotes a total reflection inclined plane (total reflection Fresnel plane), 114 indicates a transmission inclined plane (total reflection Fresnel plane), 115 denotes an outgoing plane, and n indicates the normal of the total reflection Fresnel lens plate 110B (or the outgoing plane 115).

Reference number 150 designates a projected light flux to the total reflection Fresnel lens plate 110B, 151 denotes an effective flux of light, and 152 designates a deviated flux of light (as the ineffective flux of light).

The total reflection Fresnel lens plate 110B is made up of a combination of the total reflection inclined plane 113 and the transmission inclined plane 114 adjacent to the total reflection inclined plane 113 in a periodic structure.

Next, a description will now be given of the operation. The projected light flux 150 enters at an angle to the normal n of the total reflection Fresnel lens plate 110B, apart thereof is refracted (in optical action) and then reflected (in optical action) at the transmission inclined plate 114 toward the normal n at the total reflection inclined plane 113, and then outputs as the effective flux of light 151 through the outgoing plate 115 of the total reflection Fresnel lens plate 110B.

On the other hand, the remaining part of the projected light flux 150 becomes a deviated flux of light 152, not reflected at the total reflection inclined plane 113.

The deviated flux of light 152 is inclined in direction to the normal n. A part thereof is output through the outgoing plane 115, another part thereof is reflected at the outgoing plane 115. Then, the deviated flux of light 152 reflected at the outgoing plane 115 enters again into total reflection inclined plane 113 or the transmission inclined plane 114 which forms the total reflection Fresnel lens plate 110B.

The refraction and the reflection of the deviated flux of light 152 are repeated between the total reflection inclined plane 113 or the transmission inclined plane 114 and the outgoing plane 115.

The effective flux of light 151 in the above light fluxes is the normal image light. The deviated flux of light 152 causes the generation of a double image and a ghost image which display spots and line images at incorrect display positions.

FIG. 3 is a diagram showing a configuration and operation of a conventional refraction total reflection Fresnel lens plate. FIG. 3 shows the configuration of the refraction total reflection Fresnel lens plate in which both the refraction Fresnel plane and the total reflection Fresnel plane are formed at the incident plane of the projected light flux.

In FIG. 3, the same components of the configurations shown in FIG. 1 and FIG. 2 will be referred to with the same reference numbers and characters. In FIG. 3, reference character 110C designates the refraction total reflection Fresnel lens (refraction total reflection Fresnel lens means).

Next, a description will now be given of the operation.

The projected light flux 150 enters in an angle to the normal n of the refraction total reflection Fresnel lens plate 110C. The light flux refracted at the refraction inclined plane 111 becomes the effective flux of light 153 which travels toward the direction of the normal n. In addition, the light flux refracted (in optical action) at the transmission inclined plane 114 and then reflected (in optical action) at the total reflection inclined plane 113 becomes the effective flux light 151 which travels to the normal n.

On the other hand, a projected light flux 150 and a projected light flux 150, the former is refracted (in optical action) at the ineffective facet plane 112 and the latter is refracted (in optical action) and does not perform the total reflection at the total reflection inclined plane 113, become the ineffective flux of light (as a deviated flux of light) 152.

The ineffective flux of light 152 travels towards a direction inclined relative to the normal n, and a part thereof outputs through the outgoing plane 115, and another part is reflected at the outgoing plane 115.

The ineffective flux of light 152 reflected at the outgoing plane 115 enters again into the refraction inclined plane 111, the ineffective facet plane 112, the total reflection inclined plane 113, and the transmitting inclined plane 114 which form the refraction total reflection Fresnel lens plate 110C. The refraction and reflection are then performed for the ineffective flux of light 152 between the refraction inclined plane 111, the ineffective facet plane 112, the total reflection inclined plane 113, the transmission inclined plane 114, and the outgoing plane 115.

The effective fluxes of light 151 and 153 in the above light fluxes are the normal image light. The ineffective flux of light 152 often causes a double image and a ghost image which display a spot and a line image at positions different from the normal display position.

In the configuration of the conventional transmission screen, a lenticular lens plate (omitted from diagrams) is arranged at the outgoing plane 115 side of the Fresnel lens plate 110A, the total reflection Fresnel lens plate 110B, the refraction total reflection Fresnel lens plate 110C shown in FIG. 1 to FIG. 3 in order to control a geometric field angle in a horizontal direction and an up-and-down direction and to make the image.

Because the conventional transmission screen has the configuration described above which generates the effective flux light to contributes the display of the normal projected image, it is difficult in principle to avoid the generation of the ineffective flux of light which causes the phenomenon of a double image and a ghost image. Therefore the conventional transmission screen involves a problem in which the double image and the ghost image overlap the normal projected image. Because the generation of the double image and the ghost image deteriorates a high image quality in display, there is a demand to decrease the generation of the double image and the ghost image.

The present invention is provided to solve the above-described problems, and the object of the present invention is to provide a transmission screen with a high image quality capable of avoiding any generation of ineffective fluxes of light and displaying the normal projected image only using effective fluxes of light.

In addition, another object of the present invention is to provide a projection display device capable of eliminating any generation of a double image and a ghost image and of displaying the image with a high quality.

DISCLOSURE OF INVENTION

In carrying out the invention and according to one aspect thereof, there is provided a transmission screen having Fresnel lens means, stray light eliminating means, and image display means. The Fresnel lens means has a Fresnel surface molded as an incident plane thereof for giving its optical action to projected light fluxes and for outputting the light fluxes through an outgoing plane thereof. The stray light eliminating means eliminates a light flux having only a different angle generated based on the optical action of the Fresnel surface. The image display means scatters the light flux from the stray light eliminating means and focuses the scattered one. It is thereby possible to obtain the effect to provide the transmission screen for eliminating ineffective light fluxes and displaying only a normal projected image using effective light fluxes with a high quality.

In the transmission screen according to the present invention, the Fresnel lens means is refraction Fresnel lens means having a refraction Fresnel plane formed at the incident plane thereof, and the refraction Fresnel plane has refraction inclined planes for refracting light fluxes, and ineffective facet planes, which are arranged in a periodic structure. It is thereby possible to obtain the effect to realize a highly transmission efficiency in an area of small radius of the Fresnel lens means.

In the transmission screen according to the present invention, the Fresnel lens means is total reflection Fresnel lens means having a total reflection Fresnel plane formed at the incident plane thereof. The total reflection Fresnel plane has transmission inclined planes for refracting light fluxes and total reflection inclined planes for reflecting the light fluxes refracted at the transmission inclined planes, which are arranged in a periodic structure.

In the transmission screen according to the present invention, the Fresnel lens means is refraction total reflection Fresnel lens means has a refraction total reflection Fresnel plane formed at the incident plane thereof. The refraction total reflection Fresnel plane has refraction inclined planes for refracting light fluxes, ineffective facet planes, transmission inclined planes for refracting the light fluxes, and total reflection inclined planes for reflecting the light fluxes refracted at the transmission inclined planes, which are arranged in a periodic structure. It is thereby possible to obtain the effect to realize a highly transmission efficiency in an area of a small radius of the Fresnel lens means.

In the transmission screen according to the present invention, the refraction inclined planes in the Fresnel lens means refract the projected light fluxes toward a direction approximately parallel to a normal of the outgoing plane of the Fresnel lens means. It is thereby possible to obtain the effect to form the display image of a light distribution characteristic of symmetry to the direction of the normal of the transmission screen and to display the display image for an observer at the center of the transmission screen under the optimum condition.

In the transmission screen according to the present invention, the total reflection inclined planes in the Fresnel lens means reflect the light fluxes refracted at the transmission inclined planes toward a direction approximately parallel to a normal of the outgoing plane of the Fresnel lens means. It is thereby possible to obtain the effect to form the display image of a light distribution characteristic of symmetry to the direction of the normal of the transmission screen and to display the display image for an observer at the center of the transmission screen under the optimum condition.

In the transmission screen according to the present invention, the refraction inclined planes in the Fresnel lens means refract the projected light fluxes toward a direction approximately parallel to a normal of the outgoing plane of the Fresnel lens means. The total reflection inclined planes in the Fresnel lens means reflect the light fluxes refracted at the transmission inclined planes toward the direction approximately parallel to the normal of the outgoing plane of the Fresnel lens means. It is thereby possible to obtain the effect to form the display image of a light distribution characteristic of symmetry to the direction of the normal of the transmission screen and to display the display image for an observer at the center of the transmission screen under the optimum condition.

In the transmission screen according to the present invention, the Fresnel lens means changes a ratio of a total reflection Fresnel section and a refraction Fresnel section, and the total reflection Fresnel section is composed of the transmission inclined planes and the total reflection inclined planes and the refraction Fresnel section is composed of the refraction inclined planes and the ineffective facet planes according to a distance measured from a center of its rotation. It is thereby possible to obtain the effect to further increase the transmission efficiency.

In the transmission screen according to the present invention, the stray light eliminating means has condensing light lens array means and first black stripe means. In the condensing light lens array means, unit lenses are arranged at an incident plane of a first transmission substrate in a periodic structure in an up-and-down direction. The first black stripe means is composed of transparent sections placed near a condensing light point of each unit lens and opaque sections placed at a peripheral area of the condensing light point of each unit lens, which are arranged alternately at the outgoing plane of the first transparent substrate in aperiodic structure in an up-and-down direction. It is thereby possible to obtain the effect to provide the transmission screen capable of eliminating the ineffective flux of light and of displaying the normal projected image only using the effective flux of light with a high quality.

In the transmission screen according to the present invention, the image display means is lenticular lens means having the unit lenses arranged in a periodic structure in a horizontal direction at an outgoing plane of a second transparent substrate having a scattering characteristic capable of scattering the light fluxes. It is thereby possible to obtain the effect to scatter the image light fluxes by a simple configuration in order to make the image.

In the transmission screen according to the present invention, the stray light eliminating means has holding transmission substrate for holding the first transmission substrate, the condensing light lens array means; and the first black stripe means. It is thereby possible to obtain the effect to form the stray light eliminating means even if the layer of each of the first transmission substrate and the condensing light lens array means is thin.

In the transmission screen according to the present invention, the stray light eliminating means has the condensing light lens array means and the first black stripe means, which are molded with a concentric circle shape around a center of rotation of the Fresnel lens means. It is thereby possible to obtain the effect to further exert the function of the stray light eliminating means capable of eliminating ineffective flux of light.

In the transmission screen according to the present invention, the stray light eliminating means has the condensing light lens array means and the first black stripe means, which are molded with a periodic structure of a line shape. It is thereby possible to obtain the effect to greatly release the limit from the manufacture of the stray light eliminating means and to display the good image with a low manufacturing cost.

In the transmission screen according to the present invention, the stray light eliminating means has one of the first transmission substrate having a scattering characteristic and the condensing light lens array means having the scattering characteristic. It is thereby possible to obtain the effect to prevent a deterioration of the projected image which is caused by the image light fluxes based on scintillation.

In the transmission screen according to the present invention, the image display means has second black stripe means in which transparent sections and opaque sections are arranged at the outgoing plane of a third transparent substrate alternately in a periodic structure in a horizontal direction, the transparent sections are placed near the condensing light point of each unit lens in the lenticular lens means, and the opaque sections are placed at a peripheral area of the condensing light point of each unit lens. It is thereby possible to obtain the effect to eliminate the components in an up-and-down direction and a horizontal direction and to eliminate the occurrence of a double image and a ghost image.

In the transmission screen according to the present invention, the stray light eliminating means has transparent sections through which the light fluxes pass, horizontal louver shaped opaque sections arranged in a periodic structure in an up-and-down direction between the transparent sections, and up-and-down louver shaped opaque sections arranged in a periodic structure in a horizontal direction between the transparent sections. It is thereby possible to obtain the effect to eliminate the components in an up-and-down direction and a horizontal direction and to eliminate the occurrence of a double image and a ghost image.

In the transmission screen according to the present invention, the stray light eliminating means has transparent sections through which the light fluxes pass, and a horizontal louver shaped opaque sections arranged in a periodic structure in an up-and-down direction between the transparent sections. The image display means has second black stripe means in which transparent sections and opaque sections are arranged at the outgoing plane of a third transparent substrate alternately in a periodic structure in a horizontal direction. The transparent sections are placed near the condensing light point of each unit lens in the lenticular lens means. The opaque sections are placed at a peripheral area of the condensing light point of each unit lens. It is thereby possible to obtain the effect to eliminate the components in an up-and-down direction and a horizontal direction and to eliminate the occurrence of a double image and a ghost image.

In the transmission screen according to the present invention, the louver shaped opaque section in the stray light eliminating means has a cross section so that a width of the louver shaped opaque section is changed along the direction of the normal of the outgoing plane of the Fresnel lens means. It is thereby possible to obtain the effect to easily mold the stray light eliminating means and to inject a Chinese ink or an ink of another type as the louver shaped opaque section.

In the transmission screen according to the present invention, the louver shaped opaque section in the stray light eliminating means has a cross section so that a width of the louver shaped opaque section is changed along the direction of the normal of the outgoing plane of the Fresnel lens means. It is thereby possible to obtain the effect to easily mold the stray light eliminating means and to inject a Chinese ink or another ink as the louver shaped opaque section.

In the transmission screen according to the present invention, the stray light eliminating means is formed in one body on the outgoing plane of the Fresnel lens means. It is thereby possible to obtain the effect to suppress the generation of a reflected ineffective flux of light generated at the outgoing plane of the Fresnel lens means to the minimum state.

In the transmission screen according to the present invention, the stray light eliminating means is formed in one body on the outgoing plane of the Fresnel lens means. It is thereby possible to obtain the effect to suppress the generation of a reflected ineffective flux of light generated at the outgoing plane of the Fresnel lens means to the minimum state.

A projection display device according to the present invention has a transmission screen and a projection optical system for projecting light fluxes to the transmission screen in order to focus an image on the transmission screen. The transmission screen has Fresnel lens means, stray light eliminating means, and image display means. The Fresnel lens means has a Fresnel surface molded at an incident plane thereof for giving its optical action to projected light fluxes and for outputting the light fluxes through its outgoing plane. The stray light eliminating means eliminates a light flux having only a different angle generated based on the optical action of the Fresnel surface. The image display means scatters the light flux from the stray light eliminating means to make the scattered one. It is thereby possible to effect to provide the projection display device capable of eliminating any occurrence of the generation of a double image and a ghost image and of displaying a high quality image.

BRIEF DESCRIPTION OF DRAWINGS

FIG. 4 is a diagram showing a configuration of a cross section of a transmission screen in an up-and-down direction according to a first embodiment of the present invention.

FIG. 5 is a diagram showing a configuration of the transmission screen observed from an oblique direction according to the first embodiment of the present invention.

FIG. 6A and FIG. 6B are diagrams showing a configuration of a transmission screen according to a second embodiment of the present invention.

FIG. 7A and FIG. 7B are diagrams showing a configuration of a transmission screen according to a third embodiment of the present invention.

BEST MODE FOR CARRYING OUT THE INVENTION

Figure 1:
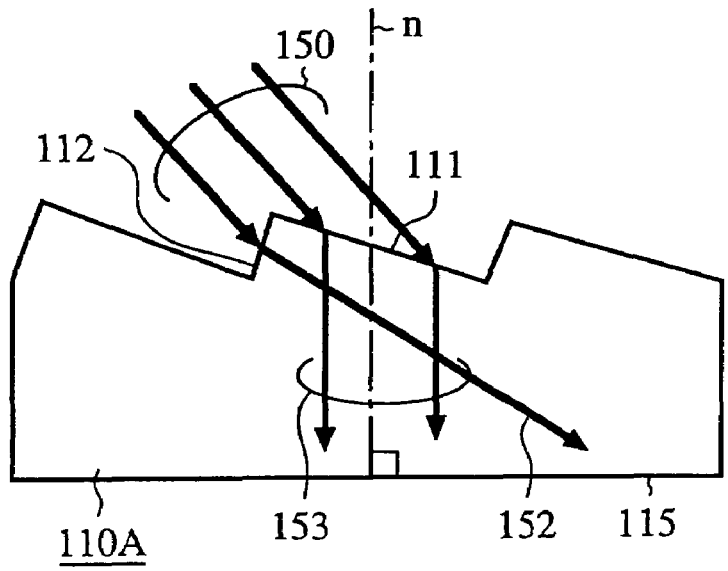
FIG. 1 is a diagram to explain a configuration and operation of a conventional refraction Fresnel lens plate.

The best mode for carrying out the invention will now be described in detail by referring to the accompanying drawings.

FIRST EMBODIMENT

FIG. 4 is a diagram showing a configuration of a cross section of a transmission screen in an up-and-down direction according to a first embodiment of the present invention. FIG. 5 is a diagram showing a configuration of the transmission screen observed from an oblique direction according to the first embodiment of the present invention.

In FIG. 4, reference character 10C designates a refraction total reflection Fresnel lens plate (refraction total reflection Fresnel lens means), reference number 20 denotes a stray light eliminating plate (stray light eliminating means), and 30 indicates an image display plate (image display means). The transmission screen comprises the refraction total reflection Fresnel lens plate 10C, the stray light eliminating plate 20, and the image display plate 30. Reference character n designates the normal which is the common one for the refraction total reflection Fresnel lens plate 10C, the stray light eliminating plate 20, and the image display plate 30. In FIG. 5, reference number 40 designates a projection optical system to output a projected light flux 50, and 90 indicates an observer who watches an enlarged display image.

Next, a description will now be given of the operation.

A part of a projected light flux 50, which is output from the projection optical system 40 and input to the refraction total reflection Fresnel lens plate 10C inclined to the normal n, is refracted at the refraction inclined plane 11 placed at the incident plane of the refraction total reflection Fresnel lens plate 10C and becomes an effective flux of light 53 which is parallel to the normal n. Another part of the projected light flux 50 is refracted at the transmission inclined plane 14, then reflected at the total reflection inclined plane 13 so as to become the effective flux of light 51 in parallel to the normal n.

The remaining part of the projected light flux 50 other than the above light fluxes is refracted at the ineffective facet plane 12 adjacent in position to the refraction inclined plane 11, or becomes the ineffective flux of light 52 (a deviated flux of light) which is inclined to the normal n after it is refracted at the transmission inclined plane 14 and not reflected at the total reflection inclined plane 13. In both the cases, the remaining part of the projected light flux 50 then enters the outgoing plane 15.

The stray light eliminating plate 20 is made up of a condensing light lens array 21 (condensing light lens array means) formed at the incident plane side of a transmission substrate 22 (first transmission substrate) and black stripes 23 (first black stripe means) formed at the side of the outgoing plane of the transmission substrate 22.

Like the typical configuration shown in FIG. 5, both the condensing light lens array 21 and the black stripe 23 are made up of a lens array in periodically formed in an up-and-down direction and transparent/opaque lattice plates.

The black stripe 23 is made up of the transparent sections 201 close to the condensing point of each unit lens forming the condensing light lens array 21 and the opaque sections 200 at surrounding area of the condensing point in periodic configuration.

In FIG. 4, the effective fluxes 51 and 53 of light deflected at the refraction total reflection Fresnel lens plate 10C in direction along the normal n inputs into the condensing light lens array 21, and condensed to an area close to the focus of the lens unit of the condensing light lens array 21, travels through the transparent sections 201 and becomes the effective outgoing light 55. The effective outgoing light 55 is finally input to the image display plate 30. In order to achieve this process, the center of each unit lens of the condensing light lens array 21 and the center of each transparent section 201 are approximately equal in position, as shown in FIG. 4 showing a sectional configuration. A lenticular lens 31 (cylindrical lens array and lenticular lens means) is formed in periodic pattern along a horizontal direction at the incident plane of the image display plate 30.

In addition, the transmission substrate 32 (second transmission substrate) is mounted at the outgoing plane side of the image display plate 30 in order to hold the lenticular lens 31. The lenticular lens 31 has a function to spread the incident light in horizontal direction.

Conventional scattering particles are held in the inside or the area close to the surface of the transmission substrate 32.

The transmission substrate 32 acts as the spreading plate in order to focus the projected image. Accordingly, a light distribution characteristic of the image light flux 80 in horizontal direction output from the transmission screen is determined based on the refraction power of the lenticular lens 31 and the scattering characteristic of the transmission substrate 32. The light distribution characteristic of the image light flux 80 in an up-and-down direction is determined based on the refraction power of the stray light eliminating plate 20 and the scattering characteristic of the transmission substrate 32.

Because both the effective fluxes 51 and 53 of light is deflected in direction along the normal n by the refraction inclined plane 11 and the total reflection inclined plane 13.

The image flux 80 output from the transmission screen has a light distribution characteristic with a good symmetry to the normal n, so that the observer 90 at the front position of the transmission screen can watch the image easily.

Next, a description will now be given of the eliminating method of the ineffective flux of light from the stray light eliminating plate 20.

The ineffective flux of light 52 generated at the refraction total reflection Fresnel lens plate 10C is input into the stray light eliminating plate 20 through the outgoing plane 15 while keeping it in the inclined state to the normal n. After the ineffective flux of light 52 is reflected at the outgoing plane 15 as the reflected ineffective flux 54 of light, it is refracted and reflected again by the refraction inclined plane 11, the ineffective facet plane 12, the total reflection inclined plane 13, and the transmission inclined plane 14 placed at the incident plane side of the refraction total reflection Fresnel lens plate 10C. A part of the light fluxes travels through the outgoing plate 15 and then input into the stray light eliminating plate 20 again as the ineffective light flux.

According to a detailed light tracing simulation, it is clear that a large part of the ineffective flux of light which is input again is a light flux greatly inclined to the normal n.

The ineffective flux 52 of light (including the re-input ineffective flux of light) which enters to the stray light eliminating plate 20 in an inclined direction to the normal n is absorbed by the opaque sections 200 of the black stripe 23 after passing through the condensing light lens array 21. Accordingly, it is possible to prevent to input it to the image display plate 30. Thereby, it is possible to greatly improve the conventional problems to eliminate the occurrences of the double image and the ghost image caused by the ineffective flux 52 of light.

The opaque sections 200 is formed by selecting application and patterning of well-known various kinds of black color paints, by selecting rough surface working of the outgoing plane of the transmission substrate 22 or a combination of those processes.

The eliminating function to eliminate the ineffective flux of light by the stray light eliminating plate 20 used in the present invention is achieved using the condensing light lens array 21 and the black stripes 23 formed in a periodic pattern in an up-and-down direction. Therefore it is possible that the stray light eliminating plate 20 having this function acts the ideal operation when the axis of rotation of the refraction total reflection Fresnel lens plate 10C is positioned on the center line of the right section and the left section of the transmission screen.

Further, the condensing light lens array 21 and the black stripes 23 are formed in a concentric configuration and a periodic structure about the center of rotation of the refraction total reflection Fresnel lens plate 10C, it is possible to effectively execute the eliminating function to eliminate the ineffective flux of light of the stray light eliminating plate 20.

In an ideal case, the shading function of the stray light eliminating plate 20 is originally used when the transmission substrate 22 and the condensing light lens array 21 do not have any scattering function. In an usual case, the elements are arranged so that the transmission substrate 32 mainly shares the scattering function to make image. However, it is possible to control the light distribution characteristic and the imaging action for the outgoing light from the transmission screen by adding the scattering function to the transmission substrate 22 and the condensing light lens array 21 as the components forming the stray light eliminating plate 20.

For example, there is an effective example to prevent the deterioration of the projected image caused by scintillation generated in the image light flux 80. In this example a simple scattering characteristic is applied to configuration materials forming the transmission substrate 22 and the condensing light lens array 21 by adding some fine particles to them. By this manner, the scattering function is distributed in the direction of the normal n of the transmission screen in addition to the scattering function of the transmission substrate 32 which is separated in distance from the stray light eliminating plate 20. It is therefore a design choice of a system design of the projection display device for the configuration elements of the stray light eliminating plate 20.

Further, when the thickness of the stray light eliminating plate 20 made up of the lens array 21, the transmission substrate 22, and the black stripes 23 is thin and difficult to hold the plate 20 itself, a transmission substrate 24 (a holding transmission substrate) is mounted, as shown by dotted lines in FIG. 4.

Still further, the inventors of the present invention have observed a projected image using the transmission screen having another configuration in which the stray light eliminating plate 20 is combined to the refraction total reflection Fresnel lens plate 10C. This stray light eliminating plate 20 is composed of line-shaped black stripes 23 of a periodic form in an up-and-down direction, like the case of the line-shaped condensing lens array 21 of the periodic form in an up-and-down direction shown in FIG. 5. The refraction total reflection Fresnel lens plate 10C is placed on the center line of the transmission screen and under the downstream side of the transmission screen.

From a result of the above observation, it is recognized to reduce the occurrence of the double image and the ghost image, overlapped on the display image, around the area in an up-and-down direction through the center of the image. Although the stray light eliminating plate 20 must be formed in a concentric circle structure to the center of the refraction total reflection Fresnel lens in an ideal case, the result of the above observation means that it is possible to obtain the image quality improvement effect of not less than a constant level even if the stray light eliminating plate 20 is replaced with the stray light eliminating plate made up of the condensing light lens array of the straight-line stripe structure and the black stripe. This replacement with the stray light eliminating plate greatly relaxes the limitation in structure of the stray light eliminating plate. It is thereby possible to provide the transmission screen capable of displaying a good image with a low cost.

As described above, according to the first embodiment, the transmission screen has the refraction total reflection Fresnel lens plate 10C, the condensing lens array 21, the transparent sections 201, the stray light eliminating plate 20, and the image display plate 30.

The optical action of the refraction total reflection Fresnel lens plate 10C processes the projected light 50 and outputs the processed one through the outgoing plane 15 thereof. The condensing light lens array 21 is composed of the unit lenses arranged of a periodic structure in an up-and-down direction at the incident plane of the transmission substrate 22.

The transparent sections 201 are mounted at the area close to the focus point of each unit lens.

The stray light eliminating plate 20 is composed of the opaque sections 200 formed close to the condensing light point of each unit lens and the black stripes 23 arranged alternately to each other in a periodic structure in an up-and-down direction at the outgoing plane of the transmission substrate 22.

The image display plate 30 is composed of the lenticular lens 31 having the unit lenses in periodic pattern in horizontal direction on the incident plane of the transmission substrate 32 which scatters the light flux based on its scattering characteristic. It is thereby possible to provide the transmission screen capable of displaying the normal projected image with a high quality only using the effective light fluxes 51 and 53.

In addition, according to the first embodiment, the refraction inclined plane 11 in the refraction total reflection Fresnel lens plate 10C refracts the projected light flux 50 toward approximately parallel direction to the normal n of the outgoing plane 15. The total reflection inclined plane 13 on the refraction total reflection Fresnel lens plate 10C reflects the light flux refracted at the transmission inclined plane 14 toward the approximately parallel direction to the normal n of the outgoing plane 15. It is thereby possible to form the display image of a light distribution characteristic of symmetry to the normal n of the transmission screen, and to display the image with the optimum condition to the observer 90 positioned at the center of the transmission screen.

Still further, according to the first embodiment, the stray light eliminating plate 20 has the transmission substrate 24 to hold the transmission substrate 22, the condensing light lens array 21, and the black stripes 23. It is possible to obtain the effect to form the stray light eliminating plate 20 even if the thickness of the layer composed of the transmission substrate 22, the condensing light lens array 21, and the black stripes 23 is thin.

Furthermore, according to the first embodiment, the stray light eliminating plate 20 has the condensing light lens array and the first black stripes molded with a periodic structure in a concentric circle to the center of rotation of the Fresnel lens plate 10C. It is thereby possible to obtain the effect that the stray light eliminating plate 20 can perform its ineffective light flux eliminating function more effectively.

Still furthermore, according to the first embodiment, the stray light eliminating plate 20 has the condensing light lens array and the first black stripes molded in a periodic structure of a straight-line shaped. It is thereby possible to obtain the effect to greatly relax the limitation of the manufacturing for the stray light eliminating plate 20 and to display the good image with a low cost.

Moreover, according to the first embodiment, the stray light eliminating plate 20 has the transmission substrate 22 with the scattering characteristic and the condensing light lens array 21 with the scattering characteristic. It is possible to obtain the effect to prevent the deterioration of the projected image caused by the scintillation generated in the projected image 80.

Still moreover, according to the first embodiment, the projection display device has the projection optical system 40 to display the image on the transmission screen by projecting the projected light flux 50 to the transmission screen. The embodiment has the effect that it is possible to provide the projection display device capable of displaying high quality images by eliminating the occurrence of the double image and the ghost image.

SECOND EMBODIMENT

The second embodiment shows how to reduce the occurrence of a double image and a ghost image generated in a wide area including the projected image area.

FIG. 6A and FIG. 6B are diagrams showing a structure of the transmission screen according to the second embodiment of the present invention. In FIG. 6A and FIG. 6B, reference number 33 designates a transmission substrate (a third transmission substrate), and 34 denotes black stripes (second black stripe means). In FIG. 6, the image display plate 30 has the function to eliminate the horizontal component of the ineffective flux of light, instead of the stray light eliminating plate 20. In order to achieve this feature, the black stripes 34 and the transmission substrate 33 are placed between the lenticular lens 31 and the transmission substrate 32 of the periodic pattern in horizontal direction. Because other components are the same as those of the case shown in FIG. 4 and FIG. 5, the explanation for the same configuration is omitted here.

FIG. 6B shows an enlarged view of the image display plate 30 shown in FIG. 6A.

In order to form the projected image, like the case of the first embodiment shown in FIG. 5, scattering particles are dispersed and held in the internal area or at the area around the surface of the transmission substrate 32. This configuration gives the scattering characteristic to the transmission substrate 32. The lenticular lens 31 is a cylindrical shaped lens array which draws in an up-and-down direction and has a periodic pattern in horizontal direction.

Further, the black stripes 34 has the periodic structure in horizontal direction so that the opaque sections 300 are shifted from the center of the lens by matching the transparent section 301 to the center of each unit lens of the lenticular lens 31. Further, the opaque sections 300 has been made by one of or a combination of a well-known selective application for each kind of black color prints, a patterning, and a selective rough surface work for the surface of the outgoing side of the transmission substrate 33.

The black stripes 34 and the lenticular lens 31 are held with a desired distance between the transmission substrate 33 and the black stripes 34 are bonded to the transmission substrate 32.

The formation of the image display plate 30 with the above described manner can achieve that the image display plate 30 has the function to eliminate the ineffective flux of light in horizontal direction based on the same principle of the stray light eliminating plate 20 shown in FIG. 5.

When the symmetric axis of rotation is on the center line of the transmission screen and the refraction total reflection Fresnel lens plate 10C is placed at the area close to the lower section of the transmission screen, the stray light eliminating plate 20 can eliminate the ineffective flux of light generated in the up-and-down direction of the area close to the center section in the horizontal direction of the transmission screen. The combination of the stray light eliminating plate 20 and the image display plate 30 can eliminate the ineffective flux of light generated in an inclined direction of the area outside of the center of the transmission screen in right and left directions. It is thereby possible to more strictly eliminate the double image and the ghost image when compared with the case shown in FIG. 4 and FIG. 5.

As described above, according to the second embodiment, the image display plate 30 has the black stripes 34 formed between the transmission substrate 32 and the lenticular lens 31. The black stripes 34 are so formed that the transparent sections 301 and the opaque sections 300 are alternately formed at the outgoing plane of the transmission substrate 33 in a periodic pattern in the horizontal direction. The black stripes 34 are formed at the area close to the condensing point of each unit lens of the lenticular lens 31. The opaque sections 300 are formed at the peripheral area of the condensing point of each unit lens. This configuration has the effect to eliminate the components in an up-and-down direction and the horizontal direction of the ineffective flux of light 52. It is thereby possible to eliminate the double image and the ghost image more strictly.

THIRD EMBODIMENT

A third embodiment will explain a modification example of the configuration of the transmission screen capable of eliminating both the components in an up-and-down direction and a horizontal direction of the ineffective flux of light, like the case of the second embodiment.

FIG. 7A and FIG. 7B are diagrams showing a configuration of the transmission screen of the third embodiment of the present invention.

In FIG. 7A, reference character 10C designates a refraction total reflection Fresnel lens plate like that shown in FIG. 4, reference number 20 denotes a stray light eliminating plate placed at the outgoing plane 15 side of the refraction total reflection Fresnel lens plate 10C, and 26 indicates transparent sections of the stray light eliminating plate 20.

Reference number 25 designates louver shaped opaque sections in the stray light eliminating plate 20, and 55 denotes an effective outgoing light flux of the stray light eliminating plate 20. The image display plate 30 has the same configuration shown in FIG. 4. Further, FIG. 7B shows an enlarged oblique view of the stray light eliminating plate 20 and the refraction total reflection Fresnel lens plate 10C observed from the effective outgoing light flux 55 side. In this enlarged oblique view, reference character 25H designates the louver shaped opaque sections in a horizontal direction, which are arranged in a periodic form in an up-and-down direction between the transparent sections 26. Reference character 25V denotes the louver shaped opaque sections in an up-and-down direction formed in a periodic pattern between the transparent sections 26 in the horizontal section.

Next, a description will now be given of the operation of the transmission screen shown in FIG. 7.

In the same manner shown in FIG. 4, by the refraction action of the refraction inclined plane 11 and the actions of the transmission inclined plane 14, and the total reflection inclined plane 13, a projected light flux 50 becomes the effective fluxes 53 and 51 of light which travel in the direction of the normal n of the transmission screen. The effective fluxes 53 and 51 of light pass through the transparent sections 26 and input as the effective outgoing light fluxes 55 into the image display plate 30. The light fluxes 55 are scattered by the lenticular lens 31 in a horizontal direction and the scattered light fluxes are then displayed as the projected image on the transmission substrate 32 having the scattering characteristic.

A light distribution characteristic of the image light flux 80 in a horizontal direction is determined based on the scattering characteristic of the lenticular lens 31 in an horizontal direction and the scattering characteristic of the transmission substrate 32.

The arrow with dotted lines designated by reference number 52 indicates an ineffective flux of light passed through the ineffective facet plane 12 of the refraction total reflection Fresnel lens plate 10C or an ineffective flux of light which is not reflected by the total reflection inclined plane 13 after passed through the transmission inclined plane 14.

This ineffective flux of light 52 is absorbed by the louver shaped opaque sections 25 placed along the direction of the normal n, or which becomes the reflected ineffective flux of light 54 after it is reflected at the boundary surface of the refraction total reflection Fresnel lens plate 10C and the stray light eliminating plate 20. After this, the reflected ineffective flux of light 54 at the boundary surface 15 is refracted and reflected by the refraction inclined plane 11, the ineffective facet plane 12, the total reflection inclined plane 13, the transmission inclined plane 14 at the incident side of the refraction total reflection Fresnel lens plate 10C, and then enters again into the boundary surface 15, and a large part thereof is absorbed by the louver shaped opaque section 52.

It is not necessary to consider any generation of the refracted ineffective light flux 54 because the boundary surface 15 seldom generates the reflection ineffective flux of light 54 in cases where the stray light eliminating plate 20 is formed in one body on the bottom surface (as the outgoing plane) of the refraction total reflection Fresnel lens plate 10C or both are bonded with an adhesive material.

It is possible to form the stray light eliminating plate 20 using acryl material, for example, lattice shaped grooves are formed using a die in which projecting rows corresponding to the louver shaped opaque sections 25 are formed and a Chinese ink or another ink with an absorptive property is then poured into the groove sections.

When the Chinese ink or another ink is poured, dusts remained on the surface of the stray light eliminating plate 20 are eliminated as necessary in order to keep the transmission characteristic of the transparent sections 26.

The stray light eliminating plate 20 formed by the above manner is bounded in one body onto the refraction total reflection Fresnel lens plate 10C made up of acryl material with an adhesive material having a same refraction index of the acryl material, for example. It is thereby possible to minimize the generation of the reflected ineffective flux of light 54. It is of course acceptable to form it by making of one piece the stray light eliminating plate 20 directly on the bottom surface of the refraction total reflection Fresnel lens plate 10C and then by injecting the Chinese ink or another ink into it.

Although FIG. 7A shows the sectional view of the transmission screen in an up-and-down direction, the projected light flux 50 has an inclined component and a horizontal component. In this case, the horizontal component of the ineffective flux of light generated is mainly absorbed by the louver shaped opaque sections 25V in an up-and-down direction. In addition, the component of the ineffective flux of light in the up-and-down direction is mainly absorbed by the louver shaped opaque sections 25H in the horizontal direction.

It is also acceptable for the louver shaped opaque sections 25, 25V, and 25H to have a shape whose width is gradually changed toward the direction of the normal n in consideration of an easily pattern-molding characteristic and an easy injecting characteristic of the Chinese ink or an ink of another type.

In this case, the louver shaped opaque sections 25 become a trapezoidal shape (omitted from the diagram) whose width is gradually changed toward the normal n in the sectional view of the transmission screen shown in FIG. 7A.

As described above, according to the third embodiment, the stray light eliminating plate 20 is composed of the transparent sections 26 which transmit light fluxes, the louver shaped opaque sections 25H in an horizontal direction arranged between the transparent sections 26 in a periodic structure in an up-and-down direction, and the louver shaped opaque sections 25V in an up-and-down direction arranged between the transparent sections 26 in a periodic structure in a horizontal direction. It is thereby possible to eliminate the components of the ineffective flux of light 52 in the up-and-down direction and in the horizontal direction. This can obtain the effect to eliminate the double image and the ghost image more strictly.

In addition, according to the third embodiment, the stray light eliminating plate 20 is so formed that the width of each of the cross sectional shape of the louver shaped opaque sections 25H and 25V is changed along the normal n of the outgoing plane 15 of the Fresnel lens plate 10C. It is thereby possible to obtain the effect to easily inject the Chinese ink or an ink of another type for the formation of the mold of the stray light eliminating plate 20 and the louver shaped opaque sections.

Still further, according to the third embodiment, the stray light eliminating plate 20 and the outgoing plane 15 of the Fresnel lens plane 10C are formed in one body, it is possible to minimize the generation of the reflection ineffective flux of light generated at the outgoing plane of the Fresnel lens plate 10C.

FOURTH EMBODIMENT

FIG. 8 shows an example of a configuration to eliminate both the components in an up-and-down direction and a horizontal direction of the ineffective flux of light by combining the louver elements and lenticular lenses with black stripes.

Figure 8C:
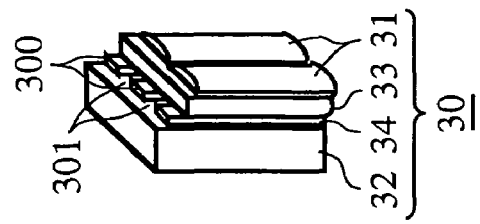
FIG. 8A to FIG. 8C are diagrams showing a configuration of a transmission screen according to a fourth embodiment of the present invention.
Figure 8B:
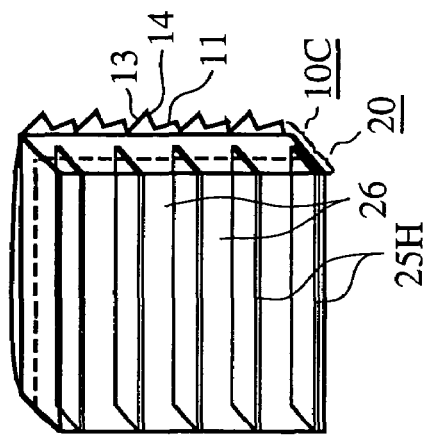
Figure 8A:
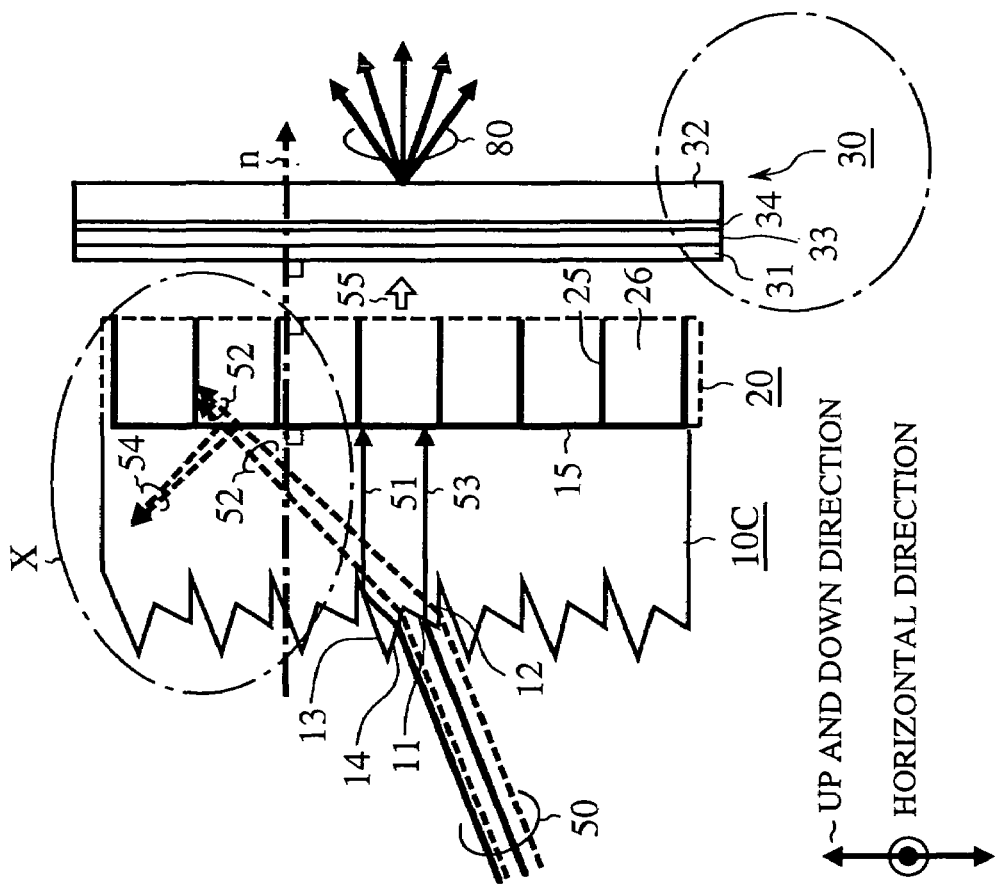

FIG. 8A, FIG. 8B, and FIG. 8C are diagrams showing a configuration of a transmission screen of the fourth embodiment of the present invention.

In FIG. 8A to FIG. 8C, reference number 20 designates a stray light eliminating plate composed of louver shaped opaque sections 25 and transparent sections 26. As shown in FIG. 8B, the louver shaped opaque sections 25 are composed only of the horizontal louver shaped opaque sections 25H arranged in a periodic pattern in an up-and-down direction.

The image display plate 30 is composed of various layers such as the lenticular lens 31, the transmission substrate 33, the black stripe 34, and the transmission substrate 32 which are laminated in order observed from the incident side of the effective outgoing light flux 55. As shown in the enlarged view of FIG. 8C, the black stripes 34 are composed of the stripe shaped opaque sections 300 and the transparent sections 301 arranged in a periodic pattern in a horizontal direction.

The center section of the transparent section 301 in the horizontal direction is placed so that it is matched to the center of each unit lens in the lenticular lens 31. The transmission substrate 33 keeps a fixed distance between the lenticular lens 31 and the black stripe 34.

The refraction total reflection Fresnel lens plate 10C has the same configuration of that shown in FIG. 4. The explanation thereof is omitted here.

Next, a description will be given of the operation of the transmission screen shown in FIG. 8.

In the same manner shown in FIG. 4, the projected light flux 50 becomes the effective fluxes 53 and 51 of light traveling toward the normal n of the transmission screen by the refraction action of the refraction inclined plane 11, the actions of the transmission inclined plane 14 and the total reflection inclined plane 13.

After passing through the transparent sections, the effective fluxes 53 and 51 of light become the effective outgoing light flux 55 and input into the image display plate 30. After the scattering in the horizontal direction, the scattered light flux is focused onto the transmission substrate 32 of the scattering characteristic and the projected image is thereby made on it.

The light distribution characteristic of the image light flux 80 in a horizontal direction is determined based on the refraction characteristic of the lenticular lens 31 and the scattering characteristic of the transmission substrate 32.

The light distribution characteristic in an up-and-down direction is determined based on the scattering characteristic of the transmission substrate 32.

The arrow with dotted lines designated by reference number 52 indicates an ineffective flux of light passed through the ineffective facet plane 12 of the refraction total reflection Fresnel lens plate 10C or an ineffective flux of light which is not reflected by the total reflection inclined plane 13 after passed through the transmission inclined plane 14.

This ineffective flux of light 52 is absorbed by the louver shaped opaque sections 25 placed along the direction of the normal n, or becomes the reflected ineffective flux of light 54 reflected at the boundary surface 15 of the refraction total reflection Fresnel lens plate 10C and the stray light eliminating plate 20.

After this, the reflected ineffective flux of light 54 is refracted and reflected by the refraction inclined plane 11, the ineffective facet plane 12, the total reflection inclined plane 13, the transmission inclined plane 14 at the incident side of the refraction total reflection Fresnel lens plate 10C, and then enters again into the boundary surface 15, and a large part thereof is absorbed by the louver shaped opaque section 52.

It is not necessary to consider any generation of the refleted ineffective light flux 54 by the boundary surface 15 because the boundary surface 15 seldom generates the reflected ineffective light flux 54 in cases where the stray light eliminating plate 20 and the refraction total reflection Fresnel lens plate 10C are formed in one body on the bottom surface (as the outgoing plane) or both are bonded with an adhesive material.

It is possible to form the stray light eliminating plate 20 using acryl material, for example, lattice shaped grooves are formed using a die in which projecting rows corresponding to the louver shaped opaque sections 25 are formed and a Chinese ink or an ink of another type with an absorptive property is then poured into the groove sections.

When the Chinese ink or the ink of another type is poured, dusts remained on the surface of the stray light eliminating plate are eliminated as necessary in order to keep the transmission characteristic of the transparent sections 26.

The stray light eliminating plate 20 formed by the above manner is bonded in one body onto the refraction total reflection Fresnel lens plate 10C made up of acryl material with an adhesive material having a same refraction index of the acryl material, for example. It is thereby possible to minimize the generation of the reflected ineffective flux of light 54. It is of course acceptable to form it by making of one piece the stray light eliminating plate 20 directly on the bottom surface of the refraction total reflection Fresnel lens plate 10C and then by injecting the Chinese ink or the ink of another type into it.

It is also acceptable for the louver shaped opaque sections 25 and 25V to have a shape whose width is gradually changed toward the direction of the normal n in consideration of an easily pattern-molding characteristic and an easy injecting characteristic of the Chinese ink or an ink of another type.

In this case, the louver shaped opaque sections 25 become a trapezoidal shape (omitted from the diagram) whose width is gradually changed toward the normal n in the sectional view of the transmission screen shown in FIG. 8A.

Although FIG. 8A shows the sectional view of the transmission screen in an up-and-down direction, the projected light flux 50 has an inclined component and a horizontal component. In this case, the horizontal component of the ineffective flux of light generated in this case is mainly absorbed by the action of the opaque sections 300 in the lenticular lens 31 and the black stripes 34 in the image display plate 30 (see FIG. 8C).

In addition, both the lenticular lenses 31 and the black stripes 34 are arranged in a periodic pattern in a horizontal direction and have the same principle to absorb the ineffective flux of light in the case shown in FIG. 4 where both the condensing light lens array 21 and the black stripes 23 are rotated in angle by 90 degrees when compared with the case shown in FIG. 8C.

In addition, the component of the ineffective flux of light in the up-and-down direction is mainly absorbed by the louver shaped opaque sections 25H in the horizontal direction (see FIG. 8C).

As described above, according to the fourth embodiment, the stray light eliminating plate 20 is composed of the transparent sections 26 passing light fluxes and the horizontal louver shaped opaque sections 25H arranged in a periodic structure in an up-and-down direction between the transparent sections. The image display plate 30 has the black stripes 34 formed between the transmission substrate 32 and the lenticular lenses 31. The black stripes 34 is composed of the transparent sections 301 and the opaque sections 300 which are alternately arranged at the outgoing plane of the transmission substrate 33 in a periodic structure in the horizontal direction. The transparent sections 301 are placed near the condensing points of unit lenses in the lenticular lenses 31. The opaque sections 300 are placed at the peripheral area of the condensing positions of the unit lenses. This can eliminate the components of the ineffective flux of light 52 in the up-and-down direction and the horizontal direction. It is possible to obtain the effect to eliminate the double image and the ghost image more strictly.

In addition, according to the fourth embodiment, the stray light eliminating plate 20 is so formed that the width of each of the cross sectional shape of the louver shaped opaque sections 25H is changed along the normal n of the outgoing plane 15 of the Fresnel lens plate 10C. It is thereby possible to obtain the effect to easily inject the Chinese ink or an ink of another type for the formation of the mold of the stray light eliminating plate 20 and the louver shaped opaque sections.

Still further, according to the fourth embodiment, the stray light eliminating plate 20 and the outgoing plane 15 of the Fresnel lens plane 10C are formed in one body, it is possible to minimize the occurrence of the reflection ineffective flux of light generated at the outgoing plane of the Fresnel lens plate 10C.

Each of the embodiments shown in FIG. 4 to FIG. 8 has shown the configuration and the operation of the transmission screen with the refraction total reflection Fresnel lens plate 10C.

However, it is also possible to obtain the same effect even if following transmission screens using Flesnel lens plates (1) to (3) instead of the refraction total reflection Fresnel lens plates 10C shown in FIG. 4 to FIG. 8.

Figure 2:
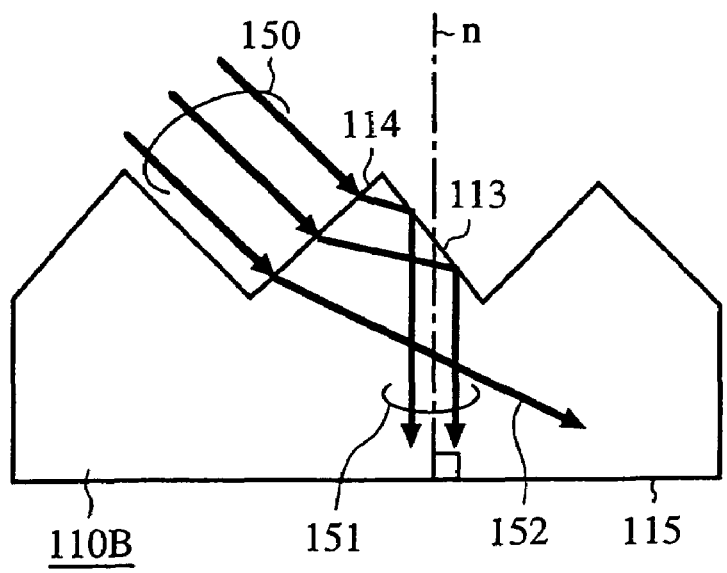
FIG. 2 is a diagram to explain a configuration and operation of a conventional total reflection Fresnel lens plate.
Figure 3:
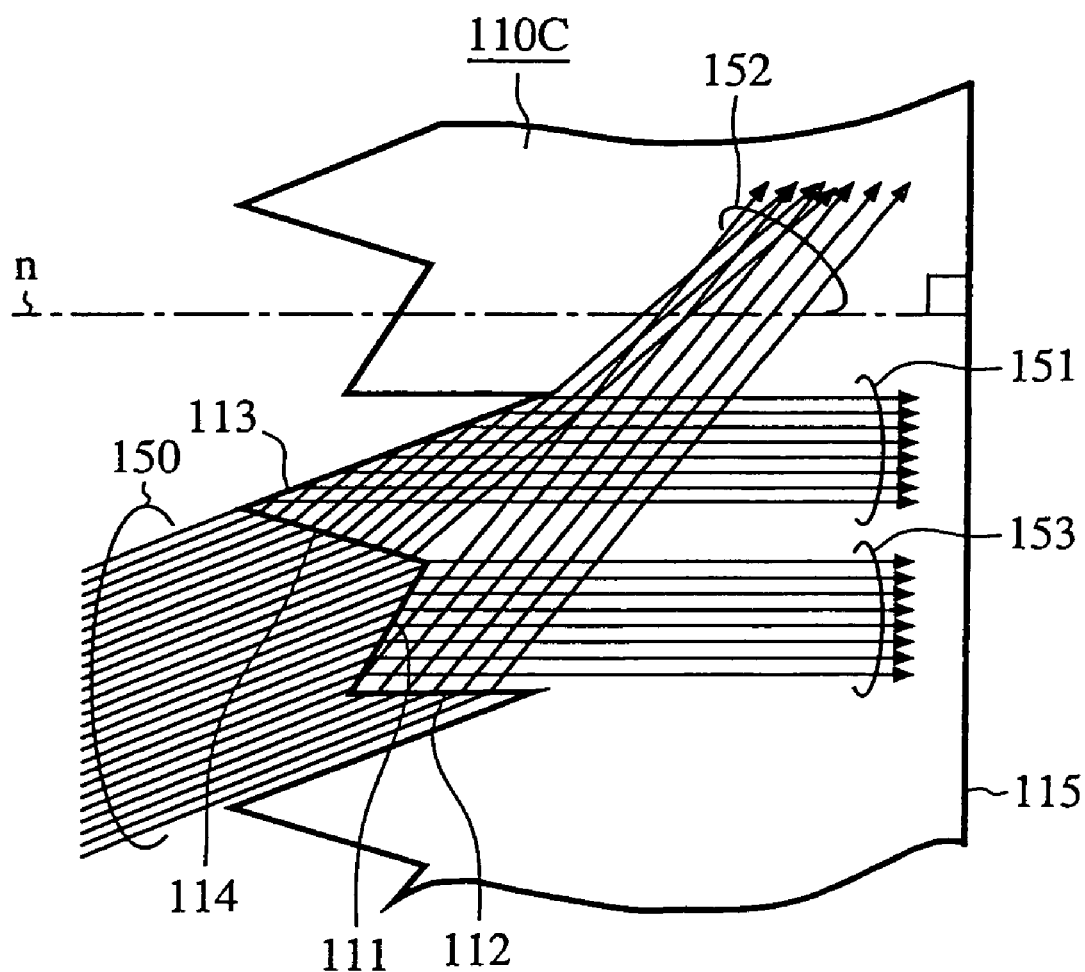
FIG. 3 is a diagram to explain a configuration and operation of a conventional refraction total reflection Fresnel lens plate.

(1) A transmission screen having the refraction Fresnel lens plate (see FIG. 1) in which a refraction Fresnel lens plate composed of the refraction inclined plane and the ineffective facet plane in a periodic structure is formed at the incident plane side thereof;

(2) A transmission screen having the total reflection Fresnel lens plate (see FIG. 2) in which a total reflection Fresnel surface composed of a total reflection inclined surface and a transmission inclined surface in a periodic structure is formed at the incident plane side thereof; and (3) A transmission screen having a refraction total reflection Fresnel lens plate of a hybrid structure including three areas of a small radius area, a large radius area, and a very large area because this refraction total reflection Fresnel lens plate has a concentric circle structure. In the small area, in order to increase a transmission efficiency the ratio of a refraction Fresnel section composed of a refraction inclined plane and an ineffective facet surface to a total reflection Fresnel section composed of a total reflection inclined plane and a transmission inclined plane is increased. In the large radius area, the transmission efficiency is gradually increased by increasing the ratio of the total reflection Fresnel section. The very large area is composed of only the total reflection Fresnel lens section in order to obtain the high transmission efficiency.

INDUSTRIAL APPLICABILITY

As set forth, the transmission screen according to the present invention is suitable for a projection system to display high quality images.

The invention claimed is:

1. A transmission screen comprising:
Fresnel lens means having a Fresnel surface molded as an incident plane thereof for giving its optical action to projected light fluxes, and for outputting the light fluxes through an outgoing plane thereof;
stray light eliminating means for eliminating an ineffective light flux generated based on the optical action of the Fresnel surface; and
image display means for focusing the light flux from the stray light eliminating means and controlling the light flux distribution characteristic.

2. The transmission screen according to claim 1, wherein the Fresnel lens means is refraction Fresnel lens means having a refraction Fresnel plane formed at the incident plane thereof, and
the refraction Fresnel plane comprises: refraction inclined planes for refracting light fluxes; and ineffective facet planes, which are arranged in a periodic structure.

3. The transmission screen according to claim 1, wherein the Fresnel lens means is total reflection Fresnel lens means having a total reflection Fresnel plane formed at the incident plane thereof, and the total reflection Fresnel plane comprises: transmission inclined planes for refracting light fluxes; and total reflection inclined planes for reflecting the light fluxes refracted at the transmission inclined planes, which are arranged in a periodic structure.

4. The transmission screen according to claim 1, wherein the Fresnel lens means is refraction total reflection Fresnel lens means having a refraction total reflection Fresnel plane formed at the incident plane thereof, and the refraction total reflection Fresnel plane comprises: refraction inclined planes for refracting light fluxes; ineffective facet planes; transmission inclined planes for refracting the light fluxes; and total reflection inclined planes for reflecting the light fluxes refracted at the transmission inclined planes, which are arranged in a periodic structure.

5. The transmission screen according to claim 2, wherein the refraction inclined planes in the Fresnel lens means refract the projected light fluxes toward a direction approximately parallel to a normal of the outgoing plane of the Fresnel lens means.

6. The transmission screen according to claim 3, wherein the total reflection inclined planes in the Fresnel lens means reflect the light fluxes refracted at the transmission inclined planes toward a direction approximately parallel to a normal of the outgoing plane of the Fresnel lens means.

7. The transmission screen according to claim 4, wherein the refraction inclined planes in the Fresnel lens means refract the projected light fluxes toward a direction approximately parallel to a normal of the outgoing plane of the Fresnel lens means, and the total reflection inclined planes in the Fresnel lens means reflect the light fluxes refracted at the transmission inclined planes toward the direction approximately parallel to the normal of the outgoing plane of the Fresnel lens means.

8. The transmission screen according to claim 4, wherein the Fresnel lens means changes a ratio of a total reflection Fresnel section and a refraction Fresnel section, and the total reflection Fresnel section is composed of the transmission inclined planes and the total reflection inclined planes and the refraction Fresnel section is composed of the refraction inclined planes and the ineffective facet planes according to a distance measured from a center of its rotation.

9. The transmission screen according to claim 1, wherein the stray light eliminating means comprises: condensing light lens array means in which unit lenses are arranged at an incident plane of a first transmission substrate in a periodic structure in an up-and-down direction; and first black stripe means composed of transparent sections placed near a condensing light point of each unit lens and opaque sections placed at a peripheral area of the condensing light point of each unit lens, which are arranged alternately at the outgoing plane of the first transparent substrate in a periodic structure in an up-and-down direction.

10. The transmission screen according to claim 1, wherein the image display means is lenticular lens means having the unit lenses arranged in a periodic structure in a horizontal direction at an incident plane of a second transparent substrate having a scattering characteristic capable of scattering the light fluxes.

11. The transmission screen according to claim 9, wherein the stray light eliminating means comprises: a holding transmission substrate for holding the first transmission substrate; the condensing light lens array means; and the first black stripe means.

12. The transmission screen according to claim 9, wherein the stray light eliminating means comprises: the condensing light lens array means; and the first black stripe means, which are molded with a concentric circle shape around a center of rotation of the Fresnel lens means.

13. The transmission screen according to claim 9, wherein the stray light eliminating means comprises: the condensing light lens array means; and the first black stripe means, which are molded with a periodic structure of a line shape.

14. The transmission screen according to claim 9, wherein the stray light eliminating means comprises: one of the first transmission substrate having a scattering characteristic; and the condensing light lens array means having the scattering characteristic.

15. The transmission screen according to claim 10, wherein the image display means comprises: second black stripe means in which transparent sections and opaque sections are arranged at the outgoing plane of a third transparent substrate alternately in a periodic structure in a horizontal direction, the transparent sections are placed near the condensing light point of each unit lens in the lenticular lens means, and the opaque sections are placed at a peripheral area of the condensing light point of each unit lens.

16. The transmission screen according to claim 1, wherein the stray light eliminating means comprises:

transparent sections through which the light fluxes pass; horizontal louver shaped opaque sections arranged in a periodic structure in an up-and-down direction between the transparent sections; and up-and-down louver shaped opaque sections arranged in a periodic structure in a horizontal direction between the transparent sections.

17. The transmission screen according to claim 10, wherein the stray light eliminating means comprises:

transparent sections through which the light fluxes pass; and a horizontal louver shaped opaque sections arranged in a periodic structure in an up-and-down direction between the transparent sections, and the image display means comprises second black stripe means in which transparent sections and opaque sections are arranged at the outgoing plane of a third transparent substrate alternately in a periodic structure in a horizontal direction, the transparent sections are placed near the condensing light point of each unit lens in the lenticular lens means, and the opaque sections are placed at a peripheral area of the condensing light point of each unit lens.

18. The transmission screen according to claim 16, wherein the louver shaped opaque section in the stray light eliminating means has a cross section so that a width of the louver shaped opaque section is changed along the direction of the normal of the outgoing plane of the Fresnel lens means.

19. The transmission screen according to claim 17, wherein the louver shaped opaque section in the stray light eliminating means has a cross section so that a width of the louver shaped opaque section is changed along the direction of the normal of the outgoing plane of the Fresnel lens means.

20. A projection display device comprising: a transmission screen; and a projection optical system for projecting light fluxes to the transmission screen in order to focus an image on the transmission screen, wherein the transmission screen comprises:

Fresnel lens means having a Fresnel surface molded at an incident plane thereof for giving its optical action to projected light fluxes and for outputting the light fluxes through its outgoing plane;

stray light eliminating means for eliminating an ineffective light flux generated based on the optical action of the Fresnel surface; and image display means for focusing the light flux from the stray light eliminating means and controlling the light flux distribution characteristic.

21. A light transmission apparatus, comprising:

a Fresnel lens having a Fresnel surface as an incident plane thereof, and directing an incoming light flux;

a stray light eliminating plate which receives a light flux from the Fresnel lens, wherein the stray light eliminating plate eliminates a vertical component of ineffective light flux, and further comprises, a condensing light lens array periodic in a vertical direction which focuses the light flux received from the Fresnel lens, a transmission substrate which receives the focused light flux from the condensing light array, and a plurality of black stripes associated with the outgoing side of the transmission substrate which are arranged to block the vertical component of ineffective light flux; and an image display plate which receives a light flux from the stray light eliminating plate, wherein the image display plate eliminates a horizontal component of ineffective light flux.

22. A light transmission apparatus, comprising:

a Fresnel lens having a Fresnel surface as an incident plane thereof, and directing an incoming light flux;

a stray light eliminating plate which receives a light flux from the Fresnel lens, wherein the stray light eliminating plate eliminates a vertical component of ineffective light flux; and an image display plate which receives a light flux from the stray light eliminating plate, wherein the image display plate eliminates a horizontal component of ineffective light flux and further comprises a condensing light lens array periodic in the horizontal direction which focuses the light flux received from the stray light eliminating plate, a first transmission substrate which receives the focused light flux from the condensing light lens array, a plurality of black stripes associated with the outgoing side of the first transmission substrate which are arranged to block the horizontal component of ineffective light by opaque sections, and a second transmission substrate which receives light flux through transparent sections of the plurality of black stripes.

\* \* \* \* \*

UNITED STATES PATENT AND TRADEMARK OFFICE
CERTIFICATE OF CORRECTION

| | | |
|---|---|---|
| PATENT NO. | : 7,079,318 B2 | Page 1 of 1 |
| APPLICATION NO. | : 10/489893 | |
| DATED | : July 18, 2006 | |
| INVENTOR(S) | : Shinsuke Shikama et al. | |

It is certified that error appears in the above-identified patent and that said Letters Patent is hereby corrected as shown below:

Face Page, (54) and column 1, line 2 please, change the title to read

--TRANSMISSION SCREEN AND PROJECTION DISPLAY DEVICE--

Claim 9, col. 19, line 55, change "transparent" to --transmission--.

Claim 10, col. 19, line 60, change "transparent" to --transmission--.

Claim 15, col. 20, line 19, change "transparent" to --transmission--.

Claim 17, col. 20, line 43, change "transparent" to --transmission--.

Signed and Sealed this

Twenty-eighth Day of November, 2006

JON W. DUDAS
*Director of the United States Patent and Trademark Office*